Nov. 9, 1971    L. M. DOUGLAS    3,618,500
PHOTOGRAPHIC EXPOSURE CONTROL SYSTEM WITH
AUTOMATIC COCKING MECHANISM
Filed June 30, 1969    6 Sheets-Sheet 1

INVENTOR.
LAWRENCE M. DOUGLAS
BY Brown and Mikulka
and
Gerald L. Smith
ATTORNEYS

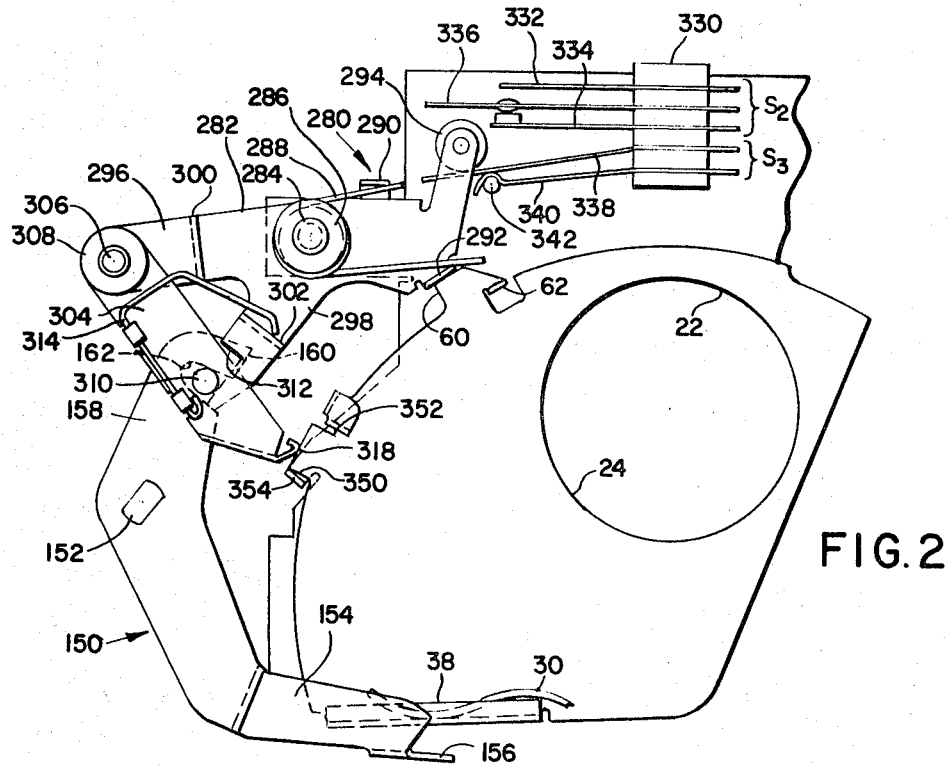
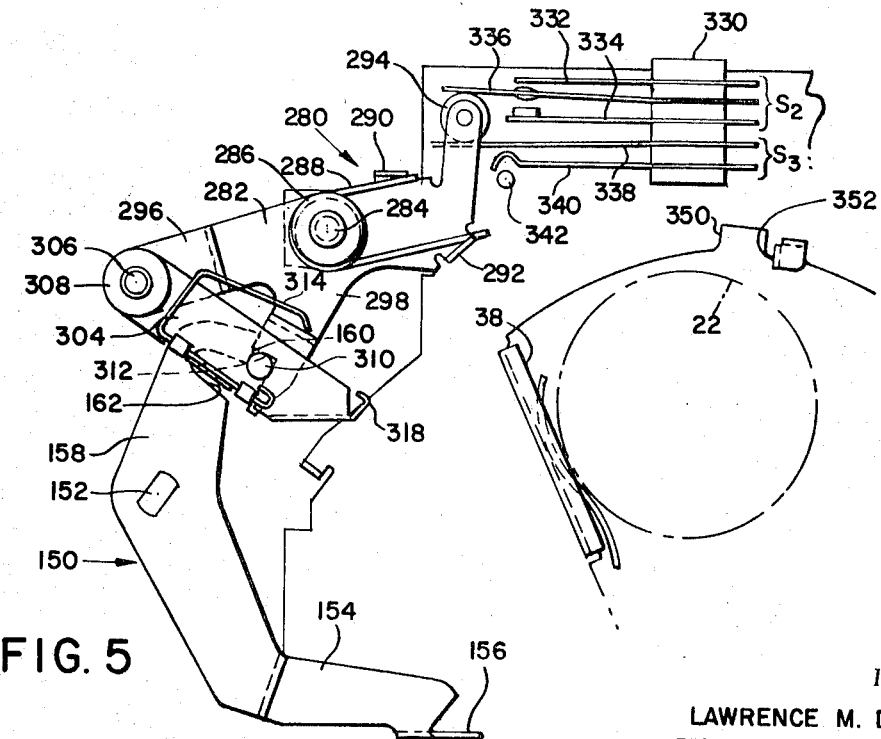

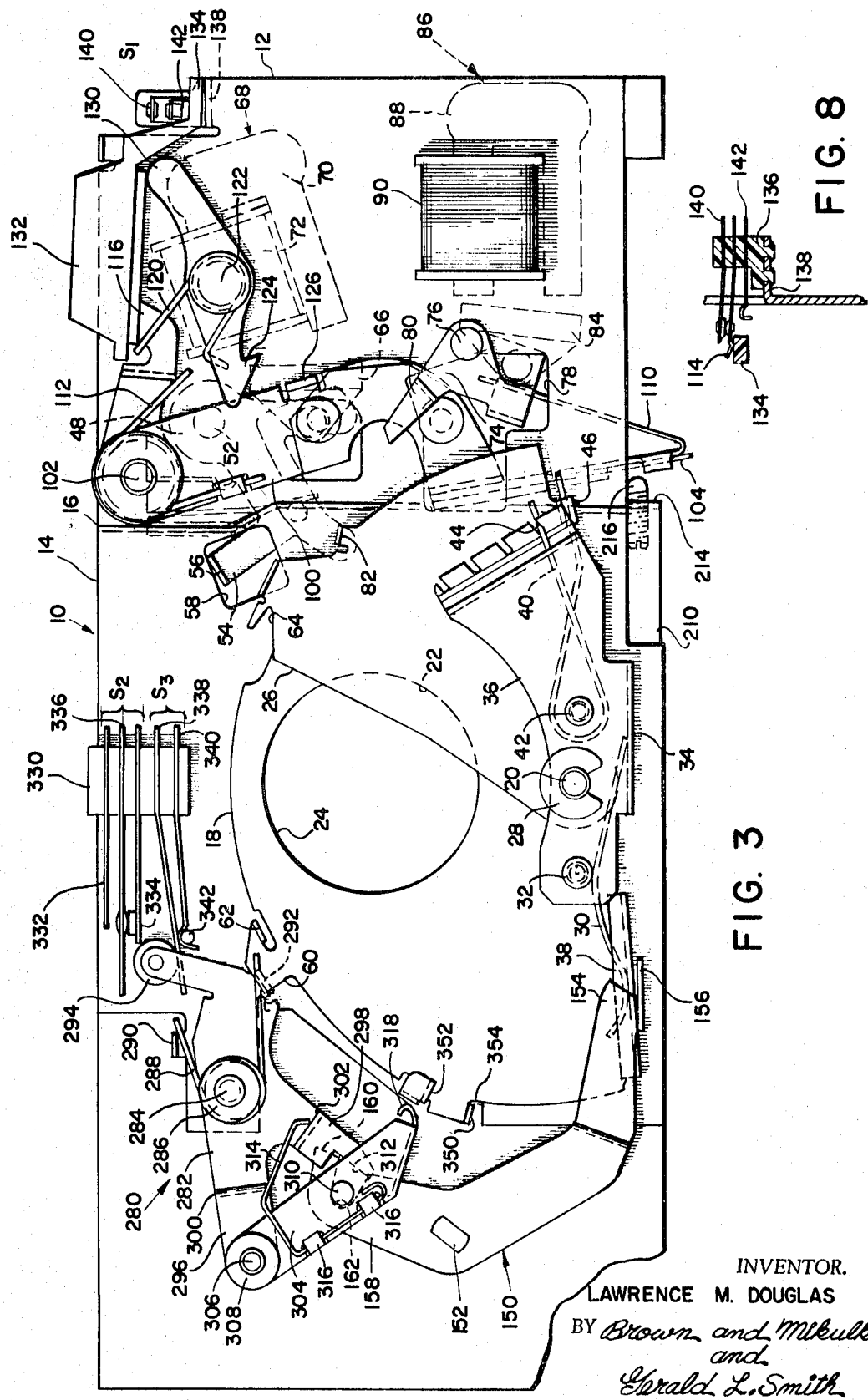

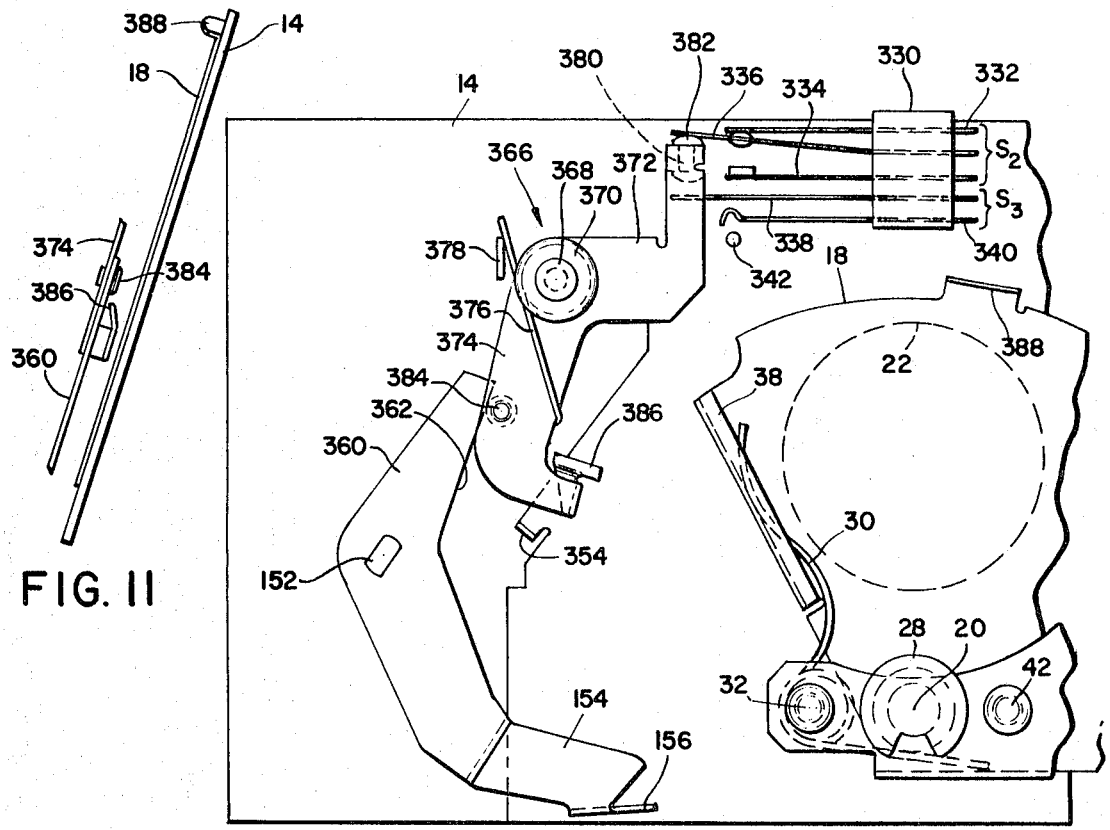
FIG. 11
FIG. 10
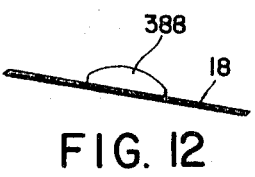
FIG. 12
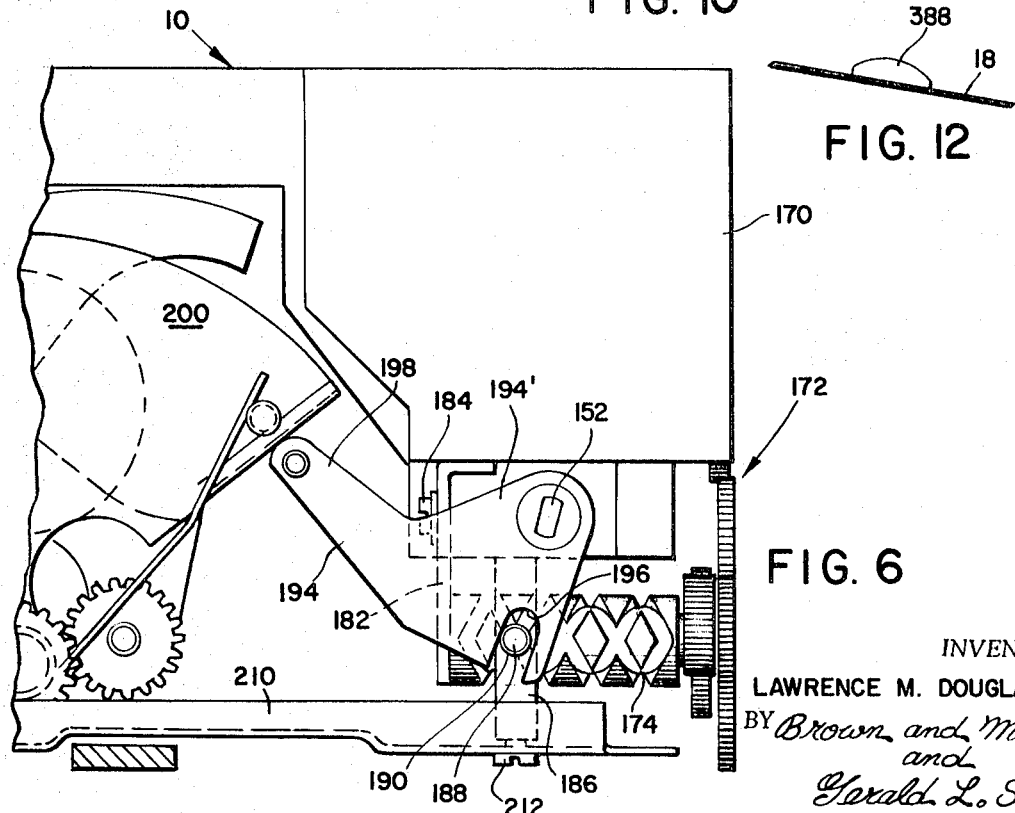
FIG. 6
INVENTOR.
LAWRENCE M. DOUGLAS
BY Brown and Mikulka
and
Gerald L. Smith
ATTORNEYS

INVENTOR.
LAWRENCE M. DOUGLAS

United States Patent Office 3,618,500
Patented Nov. 9, 1971

3,618,500
PHOTOGRAPHIC EXPOSURE CONTROL SYSTEM WITH AUTOMATIC COCKING MECHANISM
Lawrence M. Douglas, Easton, Mass., assignor to Polaroid Corporation, Cambridge, Mass.
Filed June 30, 1969, Ser. No. 837,672
Int. Cl. G03c 7/00
U.S. Cl. 95—53
34 Claims

ABSTRACT OF THE DISCLOSURE

A mechanism for automatically cocking the spring loaded elements of an exposure control mechanism following a photographic exposure. The mechanism utilizes a motion transferring member which moves reciprocally and in correspondence with a motor driven reciprocable cocking arm. A switch actuator member is operative to respond to the movement of one element of the exposure mechanism to permit energization of the motor and is repositioned to a standby status for de-energizing the motor by mechanical interaction with the motion transferring member.

The present invention relates exposure control apparatus for photographic devices and, more particularly, to a mechanism for automatically cocking or resetting such apparatus following an exposure sequence.

BACKGROUND OF THE INVENTION

Automated photographic cameras may incorporate a variety of control systems designed to lessen the number of the steps required to prepare a camera for making an exposure. In their higher forms of automation, both exposure parameters of shutter speed and relative aperture may be automatically controlled by a light sensitive circuit in conjunction with a coupled electromechanical control mechanism. These mechanisms incorporate aperture regulating elements as well as shutter blades or elements which are movable between initial or cocked and terminal positions for exerting a control over the light passing through the optical path of the camera.

An automated return of such delicate and miniaturized blades, elements and coupled control linkages to their initial or cocked orientations requires a self-powered system capable of exerting accurate control over the cocking linkages utilized to maneuver the elements into position. Additionally, following an accurate repositioning of the exposure mechanism elements, the cocking members of an automatic system must be accurately returned to their initially or standby positions. Incorrect resumption of such standby orientations may result in an interference with the operation of the exposure mechanism elements with which the cocking members cooperate during a resetting sequence.

Where an electric motor is used for powering the cocking linkages throughout their cocking and return maneuvers, an accurate control must be maintained over its energization. The motor should be energized immediately following the termination of an exposure cycle to permit as rapid a sequential operation of the exposure control system as possible. Further, once energized, the power switching controls to the motor should be responsive to the operational position of all of the control linkages coupled with the motor. Such switching must be automatic. It follows, therefore, that once energized, the motor should remain energized until, but only until, it has caused the cocking members to move through a full cocking maneuver incuding their return to a standby or initial position. Following such a period of energization, the motorized system hould be automatically de-energized. Position responsive switching is required for these operations.

SUMMARY OF THE INVENTION

The present invention is addressed to the provision of an exposure control mechanism for photographic apparatus which incorporates an automatic cocking mechanism. Driven by an electric motor, the cocking mechanism functions to urge the movable blades or elements of one or more exposure parameter regulating assemblies into initial or cocked, pre-exposure orientations.

The motor arrangement of the inventive assembly is selectively energized following an exposure sequence by a switching mechanism which functions in response to the instantaneous position of the elements of the cocking mechanism to maintain motor energization only until the completion of a cocking cycle. This position responsiveness of the switching mechanism assures a return of the cocking assembly to a proper orientation removed from possible interference with the exposure function of the system.

The invention features a cocking assembly incorporating a motion transferring member which is movable reciprocably and in correspondence with another member operative to engage and cock the movable elements of an exposure mechanism. This motion transferring member is configured and arranged to cooperate with a switch actuator which, in turn, is formed incorporating a follower configuration. In an initial or pre-exposure standby position of a cocking mechanism the follower component of the switch actuator is in contact with a bearing surface of the motion transferring member and functions in this position to maintain a switch in an orientation assuring a de-energized status of the electric motor drive system. The switch actuator is configured, when the assembly is in initial position, for response to the movement of one blade or element of the exposure mechanism, for instance, the movement of a shutter opening blade from a cocked to a terminal position. The actuator responds to this movement to release its contact with the bearing surface of the motion transferring member to permit the switch to move the switch to an orientation permitting the energization of the electric motor drive system. This system imparts a reciprocting movement to the motion transferring member permitting it to reposition itself so as to recontact and urge the switch actuator into its initial or standby orientation. Thus maneuvered, the switch actuator causes an electric motor drive system to be de-energized simultaneously with the arrival of the cocking assembly elements at their pre-exposure or standby positions.

In one aspect of the invention the switch actuator has an articulately mounted pivotal escape arm. This escape arm supports a contact member or push stud which functions as above-described with the switch actuator. The escape arm sub-assembly of the articulated switch actuator intercepts and contacts a portion of an exposure regulating element or blade. As it contacts the moving element or blade, the arm is pivoted a select distance to a select position whereupon a rotational bias on the switch actuator moves the entire actuator assembly into an alternate orientation. During the interval of dynamic contact between the escape arm and the moving element or blade, the element may function to impose a shock absorbing, motion arresting effect upon the moving element or blade. This shock absorbing activity advantageously dampens any tendency of the blade to bounce or undergo similar erratic movement upon reaching its terminal position.

Another feature and object of the invention is to provide a fully automatic cocking mechanism for a photographic camera having an electrically powered drive assembly which is energized through the joint functioning of two switches. One of these switches is operative in response to the instantaneous position of the driven members of the cocking system and is actuated by a moving blade or element of the exposure mechanism. The second switch function is operative in conjunction with the termination of an exposure cycle by the mechanism used to institute an exposure. In a preferred embodiment, the second switch arrangement is operative in response to the manual release of the exposure initiating button of a camera.

Another aspect of the invention provides an electric motor powered cocking mechanism incorporating a switching system responsive to the instantaneous position of the cocking elements of the mechanism and which functions to impose a dynamic braking action upon the electric motor at the termination of a cocking cycle.

In one embodiment of the invention, the cocking assembly utilizes a rotatably mounted arm, one portion of which is movable into engagement with certain elements of a shutter assembly to urge them into an initial or pre-exposure position. A second portion of the arm extending in another direction from the pivot forms the bearing surface for use in conjunction with a rotatable switch actuating lever. This operation is provided in conjunction with a resilient escape arm having a contacting portion or push stud which is maneuverable into a slot disposed adjacent the bearing surface. Movement of one of the shutter blades from an initial to a terminal position causes the escape arm to be moved sufficiently to cause the stud to enter the slot and permit rotation of the switch actuator.

Other objects of the invention will in part be obvious and will in part appear hereinafter.

The invention accordingly comprises the system and apparatus possessing the features, technique and properties which are exemplified in the description to follow hereinafter and the scope of the invention will be indicated in the appended claims.

BRIEF DESCRIPTION OF THE DRAWINGS

FIG. 2 is a fragmentary, plan view of the exposure mechanism of FIG. 1 showing the operation of the cocking mechanism of the invention at a point in time when the opening blade of a shutter mechanism has reached a terminal position;

FIG. 3 is a diagrammatic, plan view of the exposure mechanism of FIG. 1 showing the orientation of certain of the elements of which it is comprised at a point in time when a shutter closing blade has been released for movement from an initial position;

FIG. 5 is a fragmentary view of the exposure mechanism of FIG. 1 showing the orientation of the elements of the cocking assembly as they are returned to their initial orientations following the return of shutter blades and the like to their cocked or initial positions;

FIG. 6 is a diagrammatic, plan view of an electric motor and its related drive assembly for imparting rotational motion to the cocking linkages described in connection with FIGS. 1 through 5 and FIG. 9;

FIG. 8 is a fragmentary, side elevational cross-section of a switch component of the exposure mechanism illustrated in connection with FIGS. 1 and 3;

FIG. 10 is a fragmentary, plan view of an alternate configuration for an automatic cocking mechanism according to the invention;

FIG. 11 is a side elevational and fragmentary projection of portions of the assembly of FIG. 10; and FIG. 12 is a projection of a portion of a shutter blade illustrated in FIG. 10.

DETAILED DESCRIPTION OF THE DRAWINGS

The present invention is adaptable for use with a broad variety of exposure mechanisms and their related exposure control systems. In the embodiments illustrated herein, a cocking or resetting assembly is shown operating in a shutter mechanism of a variety utilizing a pair of opaque, planar shutter blades or elements. These blades sequentially uncover and cover the optical path of a camera. At the commencement of an exposure interval, a first of these blades, termed the "opening blade," moves to a terminal position causing the unblocking of the optical path of the camera. Following an appropriately timed interval of exposure, a second blade termed the "closing blade" is released from an initial to a terminal position causing a covering of the optical path. An exposure interval is defined by the time elapsed between the opening and closing of the shutter blades and is controlled by the timed release of the closing blade in accordance with a control program. The electrical event providing for the release of the closing blade is a change in energization level of an electromagnet. The shutter system may operate in conjunction with an automatic aperture regulating mechanism similarly disposed about the optical path of a camera. Such a dual exposure parameter control system and mechanism is described in detail in a copending application for United States Patent by John P. Burgarella, entitled "Exposure Control System," Ser. No. 837,688 filed of even date herewth.

Figure 9:
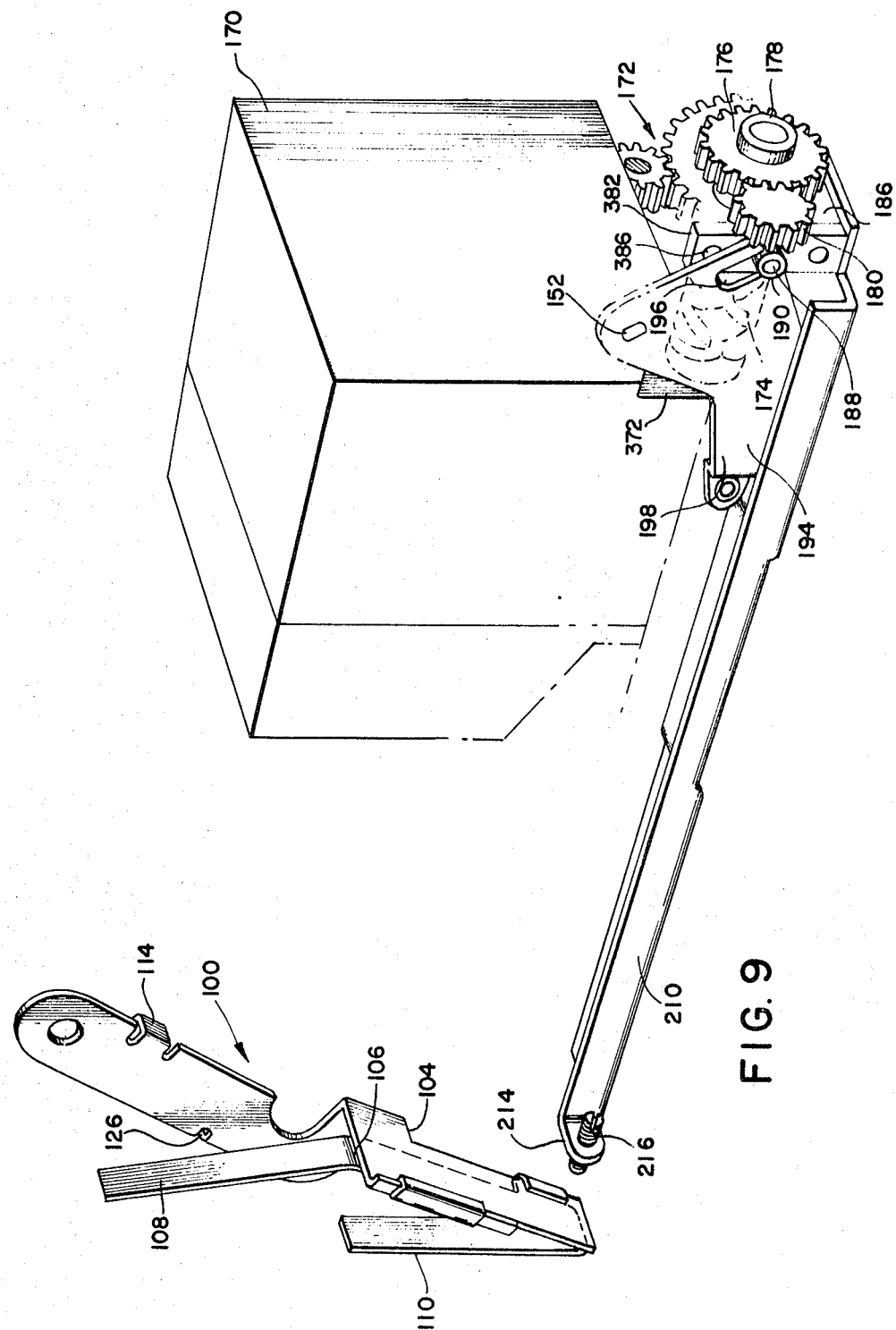
FIG. 9 is a perspective, fragmentary view of the electric motor housing and drive assembly of FIG. 6.

In FIGS. 1 to 5 of the drawings, an automatically resettable exposure control mechanism constructed in accordance with one embodiment of the invention is depicted as it assumes various orientations during an exposure and resetting cycle. The electric motor unit which functions with a drive assembly to power the cocking elements is depicted in FIGS. 6 and 9. A circuit arrangement for use with the cocking assembly is described and illustrated in connection with FIG. 7.

Figure 1:
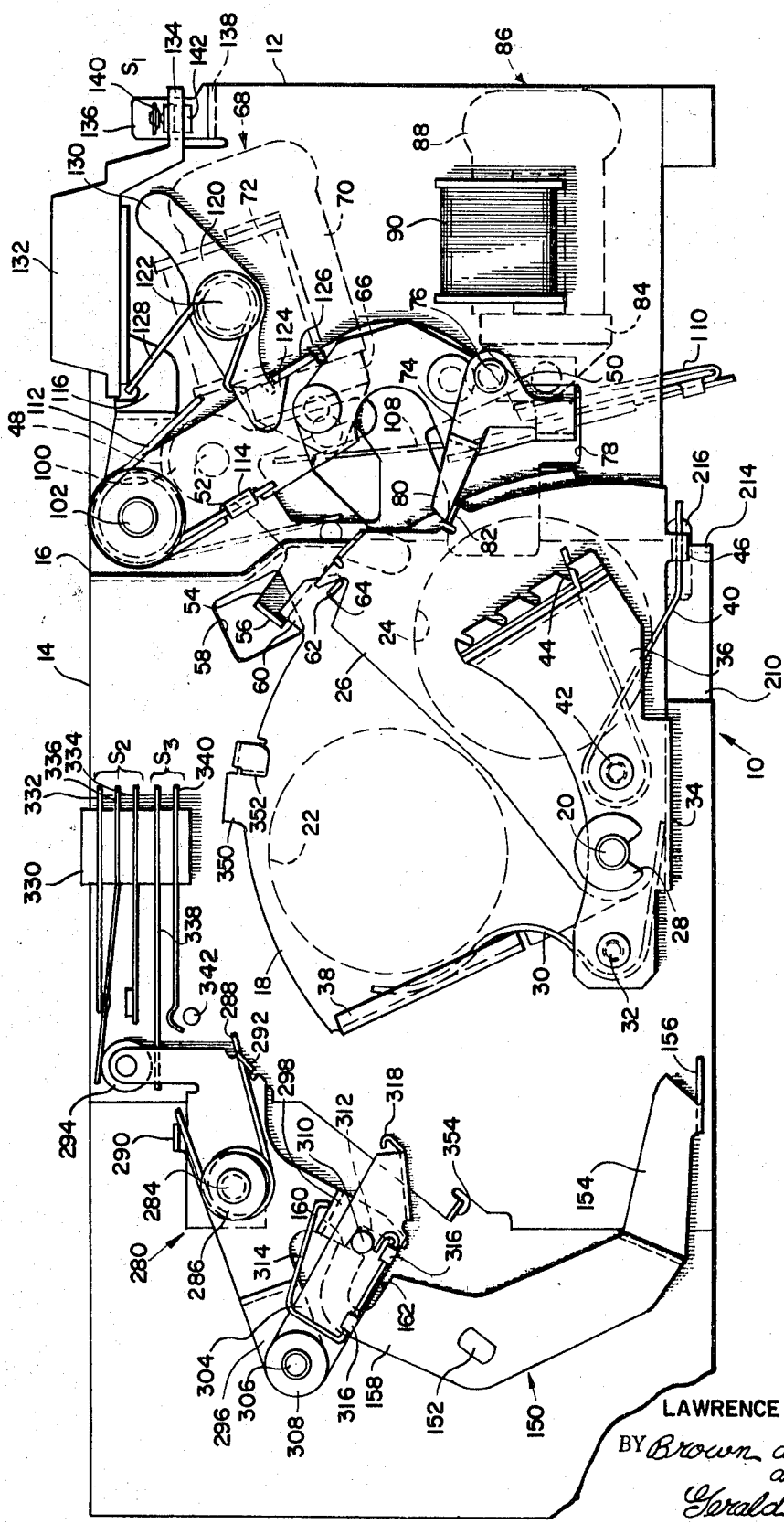
FIG. 1 is a diagrammatic, plan view of an exposure mechanism showing shutter assembly elements in a cocked position and a cocking mechanism according to the invention in a pre-exposure or standby orientation.

Referring to FIG. 1, a two-bladed shutter assembly is shown mounted in a cocked orientation on one side of a camera base plate 10. Base plate 10 is formed having two portions of different levels 12 and 14 which are joined at a riser depicted at 16.

The opening blade of the shutter assembly is illustrated at 18 as a wedge-shaped segment of a circle, the apex of the wedge being mounted for rotation about a pivotal stud 20 depending from base plate portion 14. When cocked as shown in the figure, a planar, opaque portion of the blade is extensible over an opening 22 in base plate portion 14. Opening 22 represents the maximum aperture of the optical path of the camera. The planar face of opening blade 18 also has an annular opening 24 which may have a diameter equal to that of opening 22. Openings 22 and 24 are oriented having equal radial spacing from the pivot at stud 20. Positioned over and mounted coaxially with the opening blade 18 is a planar, opaque closing blade 26 configured co-radially with the outward edge of blade 18 and having a surface area sufficient to occlude light passing through openings 22 and 24 when it is rotated into appropriate position. A retainer ring 28 is positioned over stud 20 to complete the pivotal mounting. With the configuration described, the blades 18 and 26 selectively occlude light passing through optical path opening 22 as they are rotated about their mutual pivot at 20.

To provide for the rotation of the blades during an exposure, each is biased for co-directional rotation by a spring. For instance, blade 18 is biased for rotation into the open orientation shown in FIG. 3 by a wire spring 30 centrally wound about a spring hanger 32. Spring 30 has a stationary side, the tip of which bears against a ledge 34 of a spring tension adjustment comb 36. A translational side of spring 30 is shown extending from hanger 32 to assert a rotational force upon opening blade 18 through pressure exerted against a radial flange 38 formed integrally with the blade. Closing blade 26 is biased for rotation about pivot 20 by a wire spring 40. Spring 40 is slidably wound about a spring hanger 42. The stationary side of spring 40 is retained within a selected notch as at 44 formed within comb 36. A transitional side of spring 40 is connected to a radial edge of closing blade 26 by a tab member 46 extending from its lowermost edge. Thus tensioned between comb 36 and tab 46, the spring 40 biases the closing blade 26 for rotation co-directional with blade 18. The spring force generated in spring 40 may be calibrated by adjustment of its stationary tip within any of the notches as at 44 within comb 36.

Shutter blade elements 18 and 22 are retained in the initial positions illustrated in FIG. 1 by virtue of their engagement respectively with a change-over arm 48 and a release latch 50. Mounted upon the opposite side of base plate portion 12 at a stud 52, the arm 48 is represented in dashed line fashion. The arm 48 has a component branch 54 terminating in a flanged tip portion 56 extending through a rectangular opening 58 in base plate portion 14. In the cocked orientation of FIG. 1, the flange tip 56 of arm 48 abuts against the forward edge of a tab 60 protruding outwardly and radially from the curved upper edge of opening blade 18. Tab 60 also has an outwardly bent flange portion 62 which cooperates in abutting relationship with a corresponding notch 64 formed within closing blade 26. Arm 48 also has a branch portion pivotally retaining a magnetic armature or keeper shown in dashed line fashion at 66. Armature 66 is movable into abutting contact for magnetic coupling with an electromagnet 68 also mounted on the opposite side of base plate portion 12. Electromagnet 68 is formed of a core 70 in combination with an electrical winding 72. When selectively energized, the electromagnet 68 retains keeper 66 in abutting engagement with its pole piece 70. When de-energized during an exposure sequence, electromagnet 68 permits change-over arm 48 to rotate, thereby allowing its flanged tip 56 to rise within opening 58 and remove its abutting engagement with the forward edge of tab 60 of opening blade 18. Arm 48 and its various functions in the operation of a dual exposure parameter regulating system are described in detail in copending, commonly owned United States application for patent Ser. No. 837,510, entitled "Improved Braking and Sequencing Mechanism," by the present inventor and filed of even date herewith.

When electromagnet 68 is selectively de-energized during an exposure sequence, the resultant rotation of change-over arm 48 and elevation of tip 56 permits the opening blade 18 to rotate under the bias of spring 30 to a position wherein its opening 24 is moved into registry with the optical path opening 22 of the base plate 10. This orientation of the opening blade 18 is shown in FIG. 3. When the blade reaches the orientation of that figure, an exposure interval will have commenced. The exposure interval is terminated with the release of closing blade 26 to a position wherein it occludes light passing through opening 24.

Closing blade 26 is held in the initial position depicted in FIG. 1 by a closing blade release latch 74. Release latch 74 is mounted for rotation upon an axle 76 fixed to the base plate 10 at one side of an opening formed therein at 78. The latch is configured to straddle base plate portion 12, one side forming a latching arm 80, a tip of which is arranged to abut against a corresponding flange 82 formed in an outer edge of closing blade 26. An opposite portion of release latch 74 pivotally retains a second armature or keeper 84 on the opposite side of base plate portion 12.

Armature 84 operates with a second electromagnet assembly 86. Electromagnet 86 is mounted upon base plate portion 12 and is formed having a pole piece 88 and a coil winding 90. When energized during an exposure sequence, the electromagnet 86 retains armature 84 in abutment against it and, as a result, causes arm 80 of latch 74 to abut against flange 82 of closing blade 26. This action holds the blade 26 in an initial position permitting the passage of light through opening 24 in blade 18. A de-energization of electromagnet 86 by a control system described later releases armature 84 to permit a rotation of the release latch 74 and consequent disengagement of arm 80 from tab 82. The latter release allows the closing blade to pivot to a position wherein its opaque surface will cover the opening 24 in blade 18 and cause the termination of an exposure interval. Pivotal movement of blade 26 is halted by virtue of the engagement of notch 64 with flange portion 62 of tab 60. An orientation of blade 26 as it is released and is moving towards the latter light occluding position is shown in FIG. 3.

Prior to the initiation of an exposure cycle, armatures 66 and 84 are held in engagement for magnetic coupling respectively with electromagnets 68 and 86 by a loading arm 100 which functions within the mechanism as a master actuator. Loading arm 100 is mounted for rotation upon base portion 12 at a pivot bushing or stud 102 fixed to the base. The arm extends downwardly to a position coincident with base opening 78. At that point the lower tip of the arm is bent to form a flange portion 104 which extends through the opening. As depicted more clearly in connection with FIG. 9, flange portion 104 protrudes downwardly and is configured to retain a ribbon shaped spring 106 having keeper contact extensions 108 and 110. When loading arm 100 is in the orientation of FIG. 1, these extensions respectively function to retain armatures 66 and 84 in abutting contact with electromagnets 68 and 86. Arm 100 is biased for rotation toward the opening 22 by a wire spring 112 slideably wound about bushing 102 and having a transitional end fixed to a tab 114 extending from arm 70 and a stationary end abutting against a portion of a release button bracket 116.

As illustrated in FIG. 1, loading arm 100 is held prior to exposure in a retracted position by a loading arm release latch 120. Latch 120 is pivotally mounted upon a stud 122 fixed, in turn, to base plate portion 12. The latch includes a latching tip 124 arranged to engage a tab 126 extending from the rearward edge of loading arm 100. Latch 120 is biased for rotation towards engagement with tab 126 by a wire spring 128. One end of spring 128 abuts and is biased against the bottom of release button bracket 116 and the other end hooks over the upward edge of latch 120.

The upward edge of latch 120 additionally includes a circular cam surface 130 which cooperates with the underside of bracket 116. Release button bracket 116 is mounted co-pivotally with arm 100 at bushing 102. The interaction of spring 128 and camming tip 130 of latch 120 provides an upward bias against the bottom side of bracket 116, thereby imparting an upward return action to a manually operable release button 132 mounted upon the upward side of bracket 116. A downward extension 134 of release button 132 functions to actuate a switching member $S_1$ which, in turn, is used for energizing the circuitry of an exposure control system.

Turning to FIG. 8, switch $S_1$ is shown to include an electrically insulated base molding 136 fixed to a tab extension 138 of base plate portion 12. Base mounting 136 supports upper and lower switch contact leaves illustrated respectively at 140 and 142. Intermediate leaves 140 and 142 is a common contact leaf 144 which is normally biased for contact with leaf 136. Common contact leaf 144 is held away from contact with leaf 136 by virtue of its engagement with extension 134 of release button 132. A depression of release button 132 will cause a release of electrical contact between leaves 140 and 144 and electrical engagement between leaves 142 and 144.

From the foregoing, it will be apparent that a manual depression of button 132 causes its downward movement about its pivotal mounting at 102. Switch $S_1$ is actuated as extension 134 moves downwardly in correspondence with the movement of button 132. This movement also causes the bottom surface of bracket 116 to cam against cam surface 130 of loading arm release latch 120. As this occurs, the latch rotates about its pivot at 122 to cause the release of engagement between its latching tip 124 and tab 126 of arm 100. Arm 100 pivots near the bias of spring 112 to the orientation shown in FIG. 3, thereby releasing contact extensions 108 and 110 respectively from their contact with armatures 66 and 84. As a consequence, armatures 66 and 84 may be selectively retained by appropriate energization of electromagnets 68 and 86. Other operations of the arm 100 unrelated to the instant invention are disclosed in detail in a commonly owned copending application for United States patent Ser. No. 837,682 entitled Exposure Control System Incorporating a Master Actuator by the present inventor, filed of even date herewith.

A de-energization of electromagnet 68 by a control circuitry of the camera permits change-over arm 48 to rotate and, in turn, causes the release of engagement between flange 56 and the leading edge of opening blade tab 60. Opening blade 18 rotates to the orientation of FIG. 3. Following a select exposure interval, the control circuit causes the release of an electromagnetic coupling between armature 84 and electromagnet 86. This release permits rotation of latch 74 and disengagement of its arm 80 from flange 82 of blades 26. Blade 26 pivots under the bias of spring 40 until its notch 64 engages flange portion 62 of tab 60 to terminate an exposure interval.

To automatically reposition blades 18 and 26 from their terminal to their initial orientations as illustrated in FIG. 1, a cocking assembly should preferably drive the blades respectively into re-engagement with flange tip 56 and arm 80 and then return to an initial or standby position. A cocking assembly for performing such a function is shown in the drawing as an arm member 150. Arm member 150 is mounted in driven relationship upon an axle 152 extending through the base portion 14. Member 150 includes an engaging member or leg 154 extending downwardly from its axial connection at 152. Engaging member 154 includes an engaging tip 156 contacting the radial flange 38 of blade 18 when the member 154 is rotated upwardly. As this movement occurs, tip 156 bears against flange 38 to maneuver the blades into appropriate initial orientations. Note that flange portion 62 of blades 18 engages blade 26 at slot 64 to cause the simultaneous repositioning of the closing blade into relatching engagement with arm 80. Similarly upon reaching an initial orientation, the flange 60 of arm 18 re-engages tip 56 of arm 100. As the blades are thus secured in their initial positions, member 154 is rotated in an opposite direction until it resumes its initial position as shown in FIG. 1. Cocking assembly 150 is also configured having a motion transferring member 158 formed integrally with member 154 and movable in correspondence therewith. Member 158 is formed having a bearing surface 160 along its upper edge and a slot 162 formed just below surface 160. Power for driving the assembly 150 through axle 152 is provided by an electric motor mounted upon the opposite side of base plate 10.

Referring to FIGS. 6 and 9, such a motor arrangement and its associated reduction gear assembly is illustrated. The power system includes a housing 170 incorporating the electric motor along with a reduction gear assembly driven by the motor, portions of which are indicated generally at 172. When energized, the motor within housing 170 causes the rotation of a spooling cam 174 rotatably mounted beneath housing 170. Rotation is imparted into the spooling cam 174 by a spooling cam driven gear 176 journaled over a cam bushing 178. Driven gear 176 is powered from a drive pinion 180 which, in turn, is operated from other components within the reduction gear assembly 172. A variety of such assemblies are readily available and familiar to those skilled in the art. The opposite side of spooling arm 174 is journaled for rotation into a bracket 182 fixed to the underside of housing 170 by pan head screws as at 184.

Spooling cam 174 is grooved conventionally and is assembled in conjunction with a cam collar 186 which incorporates a cam follower (not shown) slideably engaged within the grooves of the spooling cam. The cam follower is formed having a cylindrical stem portion 188 and may be retained within the cam collar 186 by a retainer cap or the like (not shown). Stem portion 188 of the cam follower is shown surrounded by a portion 190 of such a retainer cap.

As spooling cam 174 is rotated, the cam follower arrangement causes a reciprocating translation movement of collar 186 back and forth along its lengthwise dimension.

Cylindrical stem portion 188 of the cam follower arrangement operates in conjunction with a bell crank member 194. This crank member is journaled over and fixed to axle 152 as it protrudes through the base plate at 10 and is formed having a camming slot 196. Camming slot 196 is slideable over the stem portion 188. It will be apparent that as the stem is moved in camming motion across the spooling cam 174 the axle 152 is caused to rotate first in one direction and then in an opposite direction to its initial or starting position. This reciprocating rotative motion is utilized for driving the cocking assembly 150. Where addtional exposure regulating elements, for instance a spring loaded aperture mechanism, must also be repositioned in a cocking maneuver, the bell crank member 194 may be provided with a cocking extension as at 198. As illustratd in FIG. 6, extension 198 may be lifted into engagement with aperture blades or the like as at 200 to maneuver them into a cocked orientation. Such an aperture regulating mechanism is fully illustrated and described in the above mentioned United States application for patent, Ser. No. 837,682.

The spooling cam 174 and its related cam collar 186 may also be used to drive a loading ram 210 for repositioning the earlier described loading arm 100. Ram 210 extends across the bottom of base plate 10 and is slideably attached thereto. The ram is attached to the cam collar 186 by a screw 212 passing through its lower flange portion. An opposite tip of the ram 210 is formed as an outwardly bent flange 214 within which is threaded an oval point set screw 216. Cooperating with the loading arm 100, the ram fuctions in conjunction with the energization of the motorized spooling cam arrangement to cause a resetting of change-over arm 48 and closing blade release latch 50 to permit their re-engagement respectively with blades 18 and 26 as they are maneuvered into their initial or cocked positions by cocking assembly 150. Accurate control of the energization of the electric motor powered drive system of the recocking assembly is important to the performance of an automatic cocking mechanism.

Figure 7:
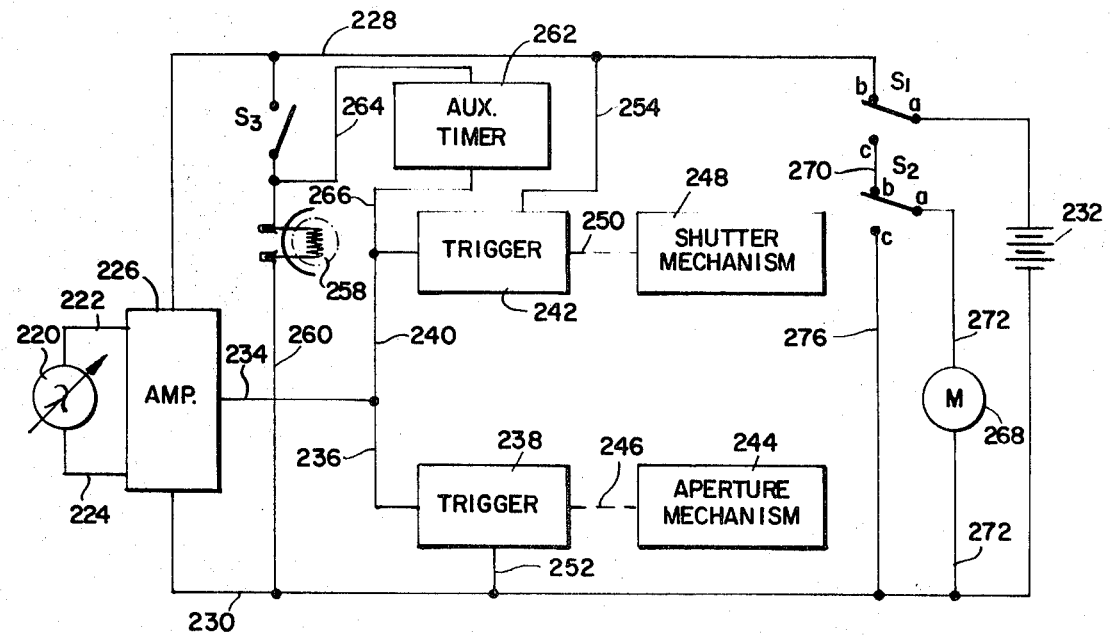
FIG. 7 is a schematic representation for an exposure control circuit operable in conjunction with an exposure mechanism described in connection with the present invention.

As a prelude to a description of the mechanical implementation of electrical switching required to operate the electric motor within housing 170 and its associated drive system, attention is turned to the schematic circuit diagram illustrated in FIG. 7. This diagram functionally illustrates an electrical circuit for a dual exposure parameter control system which automatically evaluates scene brightness or levels of illumination, weighs this evaluation with respect to the sensitometric characteristics of a film being exposed, and regulates variable exposure parameters in correspondence with that weighted evaluation. The diagram illustrates the functional contribution of switches used in energizing both the circuit and the motor and its drive assembly. A light sensing circuit is illustrated comprising a photosensitive cell 220 or the like. The cell 220 is preferabv oriented upon a camera housing in a position permitting it to evaluate the light levels of a scene coincident with the field of view of the lens system of the camera. Attenuation means may be incorporated with the mounting for the cell to permit it to be responsive to both the light levels of a scene and the instantaneous relative aperture defined by the exposure mechanism. An output signal representative of both the level of scene light and the relative aperture defined by the mechanism is presented along leads 222 and 224 to one or more amplification stages as at 226. Within the amplification stage, the output signal may be calibrated with respect to the sensitometric characeristics of film being utilized and further treated for use with the electrochemical innerface controls of the system. Power is supplied to amplification stage 226 from along buses 228 and 230 which are coupled to a power source such as a battery 232 through a power switch $S_1$. Switch $S_1$ is of a two-position variety and permits the insertion of power into stage 226 upon the closure of its common contact across terminals $a$ and $b$.

Amplification stage 226 develops output signals at line 234. The signals at line 234 are developed in sequence, the first being for purposes of regulating relative aperture and the second for regulating the parameter of exposure interval. An aperture control signal from line 234 is introduced along line 236 to a trigger circuit 238. Similarly, the output signal for controlling exposure interval is directed along line 240 to a trigger circuit 242. The signal threshold or reception levels of triggers 238 and 242 are adjusted to provide for their sequential response to the outputs of amplification stages 226. Trigger circuit 238 may be of a Schmitt variety having a normally conducting stage and a normally not conducting stage. The conducting stage of the trigger functions to continually energize an electromagnet such as depicted at 68 in FIGS. 1 and 3. This electromagnet will remain energized until the reception by the nonconducting stage of the trigger of a signal of appropriate level from along line 236. When such signal is received, the normally conducting stage is switched to a nonconductive status. This nonconductive status is reflected in a de-energization of electromagnet 68. The functional interconnection of the trigger circuit 238 with an aperture mechanism as at 244 is indicated by the dashed line 246.

Returning to FIGS. 1 and 3, it may be noted that an exposure interval is commenced with the release of opening blade 18. This release is effected by the deenergization of electromagnet 68 and the consequent rotation of arm 48. Rotation of arm 48 causes flange tip 56 to rise thereby releasing its engagement with the forward edge of tab 60. Simultaneously with such release, trigger circuit 242 commences to operate. Circuit 242 is similar to trigger circuit 238 and incorporates a conducting stage and a normally not conducting stage. The conducting stage of the trigger continually energizes an electromagnet as at 86 (FIG. 1) until such time as its normally nonconducting stage receives a signal from line 240 of appropriate level. When such signal is reached, the exposure interval is terminated as the conducting stage is rendered nonconductive and electromagnet 86 is de-energized. The circuit 242 is shown functionally connected with a shutter mechanism 248 by a dashed line 250. Referring to FIGS .1 and 3, it will be seen that a de-energization of electromagnet 86 releases its magnetic engagement with latch 74 thereby permitting arm 80 to disengage from flange 82 of closing blade 26. Closing blade 26 rotates into a position blocking aperture opening 22. Trigger circuits 238 and 242 are connected respectively with bus lines 230 and 228 from along lines 252 and 254.

When the exposure control system is operated with transient or flash illumination, a flash circuit is completed by the insertion of a flashbulb or the like 258 within line 260 coupled between buses 228 and 230. The bulb 258 is energized upon the closure of a switch $S_3$. In most photographic situations encountered, the light sensing circuit including photocell 220 will respond to the light output of the bulb 258 to regulate shutter mechanism 248. Should insufficient light be available to appropriately operate trigger circuit 242, an auxiliary timing circuit 262 inserts a signal of appropriate level to fire trigger 242 after a select interval of time. Auxiliary timer 262 is energized from along line 264 with the closure of switch $S_3$. Its output is directed to trigger circuit 242 from along line 266. A comprehensive description of the above-described circuit is provided in the above identified application for United States patent Ser. No. 837,688, by John P. Burgarella.

Looking to the arrangement of switches in the circuit of FIG. 17, the entire circuit is energized with the closure of the contact of switch $S_1$ between terminals $a$ and $b$. At the termination of the exposure interval the common terminal of switch $S_1$ is moved to an orientation connecting terminals $a$ and $c$. When so oriented, battery 232 is caused to power an electric motor 268 through a circuit including line 270, switch $S_2$, line 272 and bus 230. Electric motor 268 represents one which may be mounted within housing 170 of the mechanism described in connection with FIGS. 1, 3, 6 and 9. Following an appropriate interval of energization of motor 268, it is desirable that any rotational momentum within its parts or its drive assembly be eliminated. Accordingly, a dynamic braking arrangement is provided through the functioning of switch $S_2$ within line 276. At the completion of a cocking cycle, the common contact of switch $S_2$ is moved from a position coupling terminals $a$ and $b$ to a position coupling terminals $a$ and $c$ to insert dynamic braking.

Flash switch $S_3$ may be actuated at a select point in time when opening blade 18 is at or near its terminal position. A switching arrangement which is actuable at such time is described hereinafter.

Proper manipulation of switches $S_2$ and $S_3$ is accomplished by an interaction of both shutter opening blade 18 and the motion transferring member 154 of cocking assembly 150 with a switch actuator member 280. Referring to FIGS. 1 through 5, the functioning of switch actuator member 280 and cocking assembly 150 as they are operated throughout a cocking cycle is described. Switch actuator member 280 is formed as an articulated assembly including an arm 282 mounted for rotation about a pivot pin 284. Arm 282 is held in place over pin 284 by a retainer ring 286. The arm 282 is biased for clockwise rotation by a wire spring 288. Spring 288 is slideably wound about pivot pin 284 and is arranged having a stationary end abutting against a tab 290 depending from base pltae portion 14 and a transitional end abutting against a tab 292 bent outwardly from arm 282. Arm 282 is formed with multiple branches. One branch of the arm supports a cylindrical, electrically insulative bearing member 294 which actuates switches $S_2$ and $S_3$. The other side of arm 282 defines two other branch portions 296 and 298 bent, respectively, at 300 and 302 to elevate their outer tip areas. A contact member means including an escape arm 304 is pivotally mounted upon a stud 306 depending from the elevated tip portion of branch 296. The pivotal connection of the escape arm to member 282 is completed by a retainer ring 308 positioned over the arm 304 and stud 306. Fixed to the underside of arm 304, a push stud 310 is positioned to provide for selective abutment or contact against one edge of a notch 312 formed in the elevated tip of branch portion 298. A U-shaped wire spring 314 having one side fixed to branch 304 by tabs 316 and the other side stressed to abut against an upwardly bent wall forming the bend 302 in tip 298 biases push stud 310 against the wall of notch 312. Escape arm 304 additionally has a striking tip 318 fashioned by bending inwardly a flange portion formed oppositely from stud 306.

Assembly 280 is held in the pre-exposure orientation illustrated in FIG. 1 as a result of the abutment of push stud 310 against the inwardly facing bearing surface 160 of motion transferring member 158. Note that this abutting contact is maintained by virtue of the rotative force exerted by spring 288 and counteracted by bearing surface 160.

The pre-exposure orientation of the actuator assembly 280 provides a select switching configuration at switches $S_2$ and $S_3$. The switches correspond to the similarly identified switches in the circuit of FIG. 7. Switches $S_2$ and $S_3$ have an electrically insulative mounting base 330 fixed in appropriate position upon base plate portion 14. Base 330 supports a first switching arrangement $S_2$, including upper and lower contact leaves shown respectively at 332 and 334. Between the latter contact leaves is a common contact member 336 engageable with bearing member 294 of assembly 280 and resiliently biased for contact with leaf 334 upon the downward rotation of member 294. Beneath the first switching arrangement, base 330 supports a second switching arrangement, $S_3$, formed of upper contact leaf 338 and lower leaf 340. These switching leaves are resilient and mounted in a normally open or free configuration. Upper contact leaf 338 is of a length sufficient to permit its engagement with a lower portion of cylindrical bearing member 294. As a consequence, with the downward rotation of assembly 280, switch leaves 338 and 340 will be brought into engagement. An electrically insulative pin 342 extending from base plate portion 14 limits the downward travel of contact leaves 338 and 340 as well as the rotational travel of assembly 280.

Prior to the opertaion of the exposure mechanism, its component elements have the configuration shown in FIG. 1. An exposure sequence is initiated with the manual depression of release button 132. As this occurs, the common contact 144 of switch $S_1$ moves out of contact with leaf 140 and into contact with lower leaf 142. This maneuver is equivalent to the positioning of the common contact of switch $S_1$ in FIG. 7 from orientation $a$–$c$ to orientation $a$–$b$. Thus closed, switch $S_1$ permits the energization of electromagnets 68 and 86 from a battery power source such as described at 232. Movement of release button 132 also causes a rotation of latch 120 from loading arm 100, thereby freeing armatures 66 and 84 for selective release from their respective electromagnets. A de-energization of electromagnet 68, for instance by a trigger circuit 238, causes change-over arm 48 to rotate and thereby lift tip 56 from engagement with the leading edge of tab 60 of opening blade 18. Blade 18 commences to rotate under the bias of spring 30 towards its terminal or unblocking position. Opening blade 18 includes a positioning tab 350 along its upper periphery. Immediately behind tab 350, the upward edge of the blade 18 is bent outwardly to form a striking surface 352.

Blade 18 rotates until the forward edge of tab 350 comes in contact with an outwardly bent arresting tab 354 formed in base plate portion 14. Before this terminal position is reached, however, striking surface 352 dynamically impinges upon striking tip 318 of escape arm 304. The resultant engagement causes arm 304 to be driven in a pivotal motion about stud 306 and against the bias of wire spring 314. A resultant movement of the arm causes push stud 310 to cam against the selectively dimensioned bearing surface 160 of motion transferring member 158 until the push stud 310 is moved to a position adjacent the opening of slot 162. When such orientation is reached, the assembly 280 rotates under the bias of spring 288 to the extent permitted by the movement of stud 310 within slot 162. As the above activity occurs, the elements of the mechanism assume the configuration shown in FIG. 2. As striking surface 352 impinges upon tip 318, the rotative motion of blade 18 is brought to a gradual halt until the leading edge of tab 350 contacts tab 354. This action provides a "shock absorbing" function for arresting the motion of blade 18. As a result, any tendency for blade 18 to bounce upon making contact with arresting tab 354 is minimized.

Note in FIG. 3 that as push stud 310 moves toward the back edge of notch 162 the rotation of arm 282 causes bearing member 294 to release its engagement with common contact member 336 of switch $S_2$. Switch $S_2$ then adjusts to an orientation wherein contact leaf 336 and lower leaf 334 are closed. The movement of bearing member 294 also causes the closure of contact members 338 and 340 of switch $S_3$. Referring to FIG. 7, the above-described activity of assembly 280 causes the common contact of switch $S_2$ to move from an orientation coupling terminals $a$ and $c$ to an orientation coupling terminals $a$ and $b$. Further, the closure of contact members 338 and 340 closes switch $S_3$ somewhat simultaneously with the movement of blade 18 to an unblocking position.

Switch actuator assembly 280 assumes the orientation shown in FIG. 3 throughout an exposure interval. Following a select interval after the assumption of an unblocking position by blade 18, trigger circuit 242 causes the de-energization of electromagnet 86 and the consequent release of its magnetic engagement with release latch 74. As arm 80 rotates out of engagement with flange 82 of opening blade 26, the blade commences to rotate as illustrated in the same figure. Blade 26 continues to rotate until the notch 64 formed at its outer periphery comes into arresting contact with flange portion 62 of opening blade 18 to terminate an exposure. The shutter mechanism remains in this orientation until the camera operator releases pressure imposed upon release button 132. When released, button 132 rises under the bias of spring 128 and causes common contact 142 of switch $S_1$ to re-engage upper contact leaf 140. Referring to FIG. 7, this maneuver is equivalent to causing the common contact of switch $S_1$ to close between terminals $a$ and $c$. Inasmuch as switch $S_2$ remains in an orientation closing contacts $a$–$b$, motor 268 is energized from battery 232.

Figure 4:
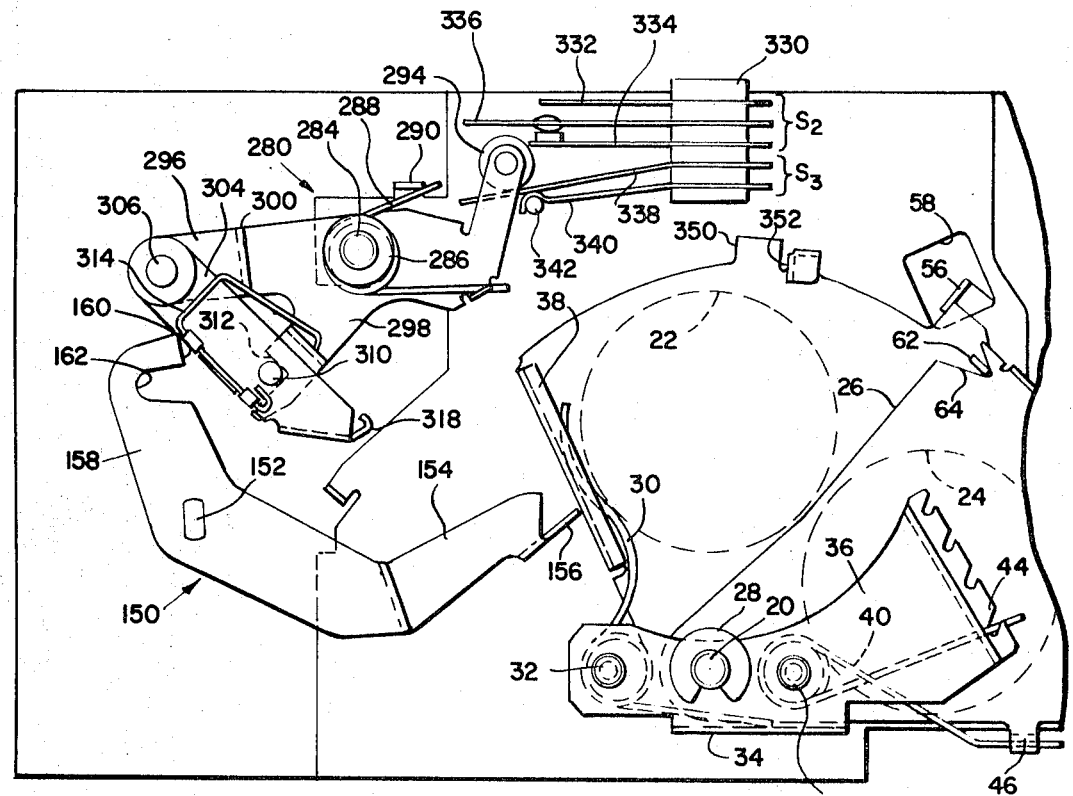
FIG. 4 is a fragmentary view of the exposure mechanism of FIG. 1 showing the orientation of certain of its elements during a blade return portion of a cocking cycle.

Referring to FIG. 4, energization of the motor 232 within housing 170 causes axle 152 to rotate in a counterclockwise direction a select amount determined by the length of spooling cam 174. This rotation causes the tip 156 of engaging member 154 to bear against flange 38 of opening blade 18 and urge the blade into its initial or cocked position. By virtue of the concurrent sliding motion of ram 210, blades 18 and 26 are relatched respectively by tip 56 and arm 80 as each of the blades reaches its initial position. Blade 26 is maneuvered simultaneously in a recocking maneuver by virtue of the engagement of its notch 64 with flange 62.

While blades 18 and 26 are being repositioned by engaging member 154, motion transferring member 158 moves reciprocally and in correspondence therewith to a terminal position shown in FIG. 4. Note that while member 158 moves away from assembly 280, the latter does not alter its second switch actuating orientation with respect to switches $S_2$ and $S_3$. As a consequence, the motor 268 remains energized to permit the return of the cocking assembly 150 to its initial position.

Looking to FIG. 6, axle 152 is caused to counterrotate when cam follower 186 has reached the limit of its travel along spooling cam 174. The switching arrangement of the exposure mechanism maintains energization of the electric motor 268 until cam follower 186 has returned to its initial or start-up position.

By virtue of its integral fabrication with engaging member 154, motion transferring member 158 reaches its terminal position concurrently with the cessation of first rotational movement of axle 152. As axle 152 counterrotates, engaging member 154 commences to rotate towards its initial position while motion transferring member 158 counterrotates to a position wherein its bearing surface 160 re-engages push stud 310 of the actuator assembly 280. The continued rotation of member 158 causes assembly 280 to rotate towards its initial orientation. The status of the assembly and member 158 during such rotation is shown in FIG. 5. Note in that figure that as assembly 280 rotates, its bearing member 294 disengages from contact leaf 338 of switch $S_3$, thereby opening the switch, and re-engages common contact member 336 of switch $S_2$. Assembly 280 continues to rotate under the driving force imparted to motion transferring member 158 by axle 152 until contact 336 is disengaged from leaf 334 and re-engaged with contact leaf 332. At this instant, all of the elements of the mechanism will have reassumed their initial positions as illustrated in FIG. 1. Returning to FIG. 7, note that the above-described activity causes switch S₂ to reassert connection between its terminals *a* and *c*. Such action inserts line 276 in shunt about the motor 268 to impose a dynamic braking upon it. Because of this braking, the motor 268 causes an accurate repositioning of axle 152 and, as a consequence, an accurate repositioning of assemblies 150 and 280. As a result, these elements are in proper position for the exposure sequence to follow and will not interfere with the continued operation of the exposure mechanism elements.

An alternate embodiment for the motion transferring member and the switch actuator assembly described above is illustrated in connection with FIG. 10 through 12. In these figures, elements of the exposure mechanism which remain unchanged between the instant and earlier embodiments are identified with identical numeration. As in the earlier embodiment, the motion transferring member moves reciprocably and in correspondence with engaging member or leg 154 and is driven by reciprocating rotation of axle 152. The motion transferring member is shown in FIG. 10 as an extension 360 of member 154. Transferring member 360 is formed having an altered bearing surface 362 in place of the earlier described bearing surface 160. For instance, no slot is formed at its terminus, as in the earlier embodiment, and the outwardly facing portion of the extension 360 also serves as a modified form of bearing surface.

A switch actuator assembly for the instant embodiment is depicted generally at 366. Assembly 366 includes an arm member mounted for rotation about the pivot pin 368 secured to base portion 14. The assembly is held on pivot pin 368 by a retainer ring 370. An arm portion of assembly 366 is formed having two branches 372 and 374. The arm is biased both inwardly and for clockwise rotation by a wire spring 376. Spring 376 is slideably wound about pivot pin 368 and is arranged having a stationary end abutting against a tab 378 depending from base plate portion 14 and a transitional end hooked over and abutting against the forward and top edges of branch 374. Branch 372 of the assembly is configured at 380 to support an electrically insulative contact member 382. Contact member 382 functions in conjunction with contact leaves 336 and 338 of switches S₂ and S₃ in a manner identical with the earlier disclosed embodiment. No escape arm is provided with the instant embodiment, however, a push stud 384 is secured to the underside of branch 374 of the assembly. The end or tip portion of branch 374 forms a cam follower surface 386 (see FIG. 11). It may be noted from FIGS. 10 and 11 that the bearing surface 362 of motion transferring member 360 bears against push stud 384 in opposition to the rotational bias of wire spring 376 when the assembly is in the initial orientation depicted.

Cam follower 386 is oriented so as to intercept a rounded camming tab or wedge 388 formed in the peripheral surface of opening blade 18 and bent outwardly therefrom (See FIG. 12.)

An opening rotational movement of opening blade 18 brings camming tab 388 into contact with cam follower 386 and causes branch 374 of the assembly 366 to rise outwardly against the bias of spring 376 from base plate 14 until the bottom surface of push stud 384 is above the front edge of bearing surface 362 of member 360. This elevation of the push stud 384 permits the assembly 366 to rotate under the bias of spring 376 until such time as bearing member 382 disengages from common contact leaf 336 and engages contact leaf 338. During the rotation of assembly 366, the bottom surface of push stud 384 cams over the surface of member 360 a select distance. Member 360 is dimensioned, however, such that stud 384 does not terminate contact with the surface during this movement.

During a cocking cycle, the outward surface of member 360 rotates out of engagement with the bottom surface of push stud 384 until released therefrom. Spring 376 causes branch 374 to flex slightly inwardly as the stud is released. As a result, during a counterrevolution, the forward bearing surface 362 of member 360 is permitted to re-engage push stud 384 and urge the assembly 366 into its initial pre-exposure position. As the assembly 366 returns to its initial position it operates upon switches S₂ and S₃ as in the earlier embodiment to de-energize the electric motor and provide dynamic braking.

Since certain changes may be made in the above exposure control mechanisms without departing from the spirit and scope of the invention herein involved, it is intended that matter contained in the above description or shown in the accompany drawings shall be interpreted as illustrative and not necessarily in a limiting sense.

I claim:

1. An exposure control mechanism for photographic apparatus comprising:
   means defining exposure aperture;
   means for regulating an exposure parameter including at least one element movable between initial and terminal positions for controlling the passage of light through said aperture;
   means for urging said element between said initial and terminal positions;
   means for retaining said element in said initial position and for selectively causing the release of said element for movement from said initial position toward said terminal position;
   cocking means having an engaging member reciprocably movable from a first position when said element is in said terminal position for engaging said element and moving to a second position selectively causing the return of said element to said initial position and movable from said second position to said first position when said element is in said initial position;
   motor means for providing a rotatinal drive output;
   driven means responsive to said rotary drive output to convert said rotary drive output to reciprocable movement for causing said engaging member to move from said first to said second position upon activation of said motor means and upon continued activation for causing said engaging member to move from said second to said first position; and
   actuating means responsive to the position of said engaging member for activating said motor means and for stopping said rotational drive output of said motor means when said engaging member is returned to said first from said second position.

2. The exposure control mechanism of claim 1 wherein said driven means comprises a spooling cam coupled in driven relationship with said motor means;
   cam follower means coupled in driven relationship with said spooling cam; and
   means operatively associating said cam follower means with said engaging member for causing said reciprocable movement between said first and second positions.

3. The exposure control mechanism of claim 2 in which said motor means comprises an electric motor.

4. The exposure control mechanism of claim 3 to the wherein said actuating means comprises switch means responsive to the orientation of said engaging member for selectively energizing said electric motor from a source of power.

5. An exposure control mechanism for photographic apparatus comprising:
   means defining an exposure aperture;
   means for regulating an exposure parameter including at least one element movable between initial and terminal positions for controlling the passage of light through said aperture;
   means for urging said element between said initial and terminal positions;
   release means for causing the release of said element for movement from said initial position toward said terminal position;

a cocking assembly having an engaging member reciprocably movable between initial and terminal positions for engaging said element and selectively causing its return from said terminal to said initial position, and a motion transferring member movable reciprocably and in correspondence with said engaging member between initial and terminal positions;

an electric motor;

driven means coupling said motor in driving relationship with said cocking assembly for causing the said reciprocable movement of said engaging member and said motion transferring member when said motor is energized;

switch means having a first orientation for energizing said motor from a power source and a second orientation for causing the de-energization of said motor; and switch actuator means responsive to the movement of said element for moving said switch means into said first orientation and responsive to said movement of said motion transferring member toward said initial position for causing said switch means to assume said second orientation simultaneously with the arrival of said motion transferring member at said initial position.

6. The exposure control mechanism of claim 5 wherein said cocking assembly motion transferring member incorporates bearing surface means selectively contactable with said switch actuator means for engaging said switch actuating means when moved from said terminal to said initial position to cause said assumption of said switch means second orientation.

7. The exposure control mechanism of claim 6 wherein said switch actuator means is configured and arranged to release from said initial position contact with said bearing surface means in response to dynamic contact with said movable element for causing said switch means to assume said first orientation.

8. The exposure control mechanism of claim 7 wherein said switch actuator means is configured and arranged for causing said dynamic contact near said movable element terminal position.

9. The exposure control mechanism of claim 7 including bias means for urging said switch actuator means into an orientation causing said switch means to assume said first orientation.

10. The exposure control mechanism of claim 7 including power switch means responsive to the actuation of said release means to move away from and return to one orientation for energizing said motor when in said one orientation.

11. The exposure control mechanism of claim 7 wherein said switch actuator means includes contact member means for effecting said releasable contact with said bearing surface means.

12. The exposure control mechanism of claim 7 wherein said switch actuator means comprises:

an arm member rotatable in one direction to cause said switch means to move into said first orientation and rotatable in an opposite direction to cause said switch means to assume said second orientation;

biasing means for urging said arm member to rotate in said one direction; and contact member means mounted upon said arm member and configured and arranged for effecting said releasable contact with said bearing surface means.

13. The exposure control mechanism of claim 7 wherein said switch means is operative when in said second orientation to cause the dynamic braking of said electric motor.

14. The exposure control mechanism of claim 7 including flash energization switch means for causing the illumination of a scene to be photographed in response to the actuation of said switch actuator means.

15. An exposure control mechanism for photographic apparatus comprising:

means defining an exposure aperture;

means for regulating an exposure paramater including at least one element movable between cocked and rest positions for controlling the passage of light through said aperture;

means for urging said element between said positions;

release means for causing the release of said element for movement from said cocked position toward said rest position;

a cocking assembly having an engaging member reciprocably movable between initial and terminal positions for engaging said element and selectively causing its return from said rest to said cocked position, and a motion transferring member movable reciprocably and in correspondence with said engaging member between initial and terminal orientations;

an electric motor;

driven means coupling said motor in driving relationship with said cocking assembly for causing the said reciprocable movement of said engaging member and said motion transferring member when said motor is energized;

switch means having a first orientation for energizing said motor from a power source and a second orientation for causing the de-energization of said motor;

switch actuator means movable between initial and terminal positions and engageable with said switch means for causing said switch means to assume said first orientation when in said terminal position and for causing said switch means to assume said second orientation when in said initial position;

an escape arm coupled with said switch actuator means and movable with respect thereto between first and second positions, said escape arm being contactable and movable with said motion transferring member when said member is moved toward and is in said initial position so as to cause said switch actuator means to assume said initial position simultaneously with the assumption of said initial orientation by said transferring member and movable to said second position in response to the said movement of said element so as to cause said switch actuator means to move to said terminal position; and means associated with said element for causing the said release of said escape arm from said contact during the movement of said element from said initial toward said terminal position.

16. The exposure control mechanism of claim 15 including first biasing means for urging said switch actuator means to move from said initial position toward said terminal position.

17. The exposure control mechanism of claim 16 including second biasing means for urging said escape arm to move from said second toward said first position.

18. The exposure control mechanism of claim 17 wherein said switch actuator means is configured and arranged to releasably retain said escape arm in said first position against the force of said second biasing means.

19. The exposure control mechanism of claim 18 wherein said switch actuator means comprises an arm member rotatable between said initial and terminal positions.

20. The exposure control mechanism of claim 19 wherein said escape arm is configured and arranged for contact with said regulator means element during said movement between said cocked and rest positions and is responsive to dynamic contact therewith to move from said first to said second position.

21. The exposure control mechanism of claim 19 wherein said switch means is operative when in said second orientation to cause the dynamic braking of said electric motor.

22. The exposure control mechanism of claim 19 wherein said motion transferring member is configured having a bearing surface for providing said contact with said escape arm, said bearing surface having a dimension selected for terminating said contact simultaneously with the movement of said escape arm into said second position.

23. The exposure control mechanism of claim 22 wherein said escape arm includes a push stud means for effecting said contact with said motion transferring member bearing surface.

24. The exposure control mechanism of claim 23 wherein said motion transferring member is configured to define a slot for receiving said push stud when said escape arm is moved into said second position.

25. The exposure control mechanism of claim 17 including flash activating switch means responsive to the movement of said switch actuator means to said terminal position for causing the energization of an artificial illuminating device.

26. An exposure control mechanism for photographic apparatus comprising:
  means defining an exposure aperture;
  shutter means including at least one element movable between cocked and rest positions for regulating the interval of exposure through said aperture;
  means for urging said element between said positions;
  release means for causing the release of said element from said cocked position toward said rest position;
  a cocking assembly having an engaging member reciprocably movable between initial and terminal positions for engaging said shutter element and selectively causing its return from said rest to said cocked position, and a motion transfer arm reciprocably rotatable between initial and terminal positions in correspondence with said engaging member and having a bearing surface of select dimension;
  an electric motor;
  driven means coupling said motor in driving relationship with said cocking assembly for causing the said reciprocal movement of said engaging member and said motion transfer arm when said motor is energized;
  a switch actuator element configured and arranged for engagement with said motion transfer arm bearing surface, rotatable in coincidence with its movement toward and into said initial position to assume a first orientation, and responsive to the movement of said shutter element from said cocked to said rest position to disengage from said bearing surface and assume a second orientation; and
  switch means responsive to said actuator element second orientation to assume a first position for energizing said motor from a power source and responsive to said actuator element first orientation to assume a second position for causing the de-energization of said motor.

27. The exposure control mechanism of claim 26 including first biasing means for urging said switch actuator element to rotate from said first orientation toward said second orientation.

28. The exposure control mechanism of claim 27 wherein said switch actuator element is configured and arranged to disengage from said bearing surface in response to dynamic contact with said shutter means element during said movement from said cocked position to said rest position.

29. The exposure control mechanism of claim 28 in which said switch actuator element includes an escape arm coupled to move with respect thereto between first and second positions, said escape arm being configured to provide said engagement with said motion transfer arm bearing surface when in said first position and providing said disengagement therefrom when in said second position.

30. The exposure control mechanism of claim 29 including biasing means for urging said escape arm to move from said second position toward said first position.

31. The exposure control mechanism of claim 30 wherein said escape arm is configured to provide said dynamic contact with said shutter means element when in said first position and is movable to said second position in response to said contact.

32. The exposure control mechanism of claim 28 wherein said switch means is operative in said second position to cause the dynamic braking of said electric motor.

33. The exposure control mechanism of claim 32 including power switch means responsive to the actuation of said release means to move between first and second circuit completing orientations for energizing said motor when in said first orientation and for prohibiting the energization of said motor when in said second orientation.

34. An exposure control mechanism for photographic apparatus comprising:
  means defining an exposure aperture;
  means for regulating an exposure parameter including at least one element movable between initial and terminal positions for controlling the passage of light through said aperture;
  means for urging said element between said initial and terminal positions;
  release means for causing the release of said element for movement from said initial position toward said terminal position;
  a cocking assembly having an engaging member reciprocably movable between initial and terminal positions for engaging said element and selectively causing its return from said terminal to said initial position, and a motion transferring member movable reciprocably and in correspondence with said engaging member between initial and terminal positions;
  an electric motor;
  driven means coupling said motor in driving relationship with said cocking assembly for causing the said reciprocable movement of said engaging member and said motion transferring member when said motor is energized;
  switch means having a first orientation for energizing said motor from a power source and a second orientation for causing the de-energization of said motor; and
  switch actuator means responsive to the movement of said element for moving said switch means into said first orientation and responsive to said movement of said motion transferring member toward said initial position for causing said switch means to assume said second orientation simultaneously with the arrixal of said motion transferring member at said initial position.

References Cited
UNITED STATES PATENTS 1,873,654    8/1932    Mannick    95—31 ACFS
3,448,670    6/1969    Suzuki    95—31 ACFS SAMUEL S. MATTHEWS, Primary Examiner M. H. HAYES, Assistant Examiner U.S. Cl. X.R.

95—31 AC